United States Patent [19]
Huber et al.

[11] Patent Number: 5,264,915
[45] Date of Patent: Nov. 23, 1993

[54] INTERFERENTIAL MEASUREMENT DEVICE FOR AT LEAST ONE DIRECTION OF MEASUREMENT

[75] Inventors: Walter Huber, Traunstein; Wolfgang Holzapfel, Obing; Hans R. Kober, Kirchweidach, all of Fed. Rep. of Germany

[73] Assignee: Johannes Heidenhain GmbH, Traunreut, Fed. Rep. of Germany

[21] Appl. No.: 777,746

[22] Filed: Oct. 16, 1991

[30] Foreign Application Priority Data

Oct. 20, 1990 [EP] European Pat. Off. ......... 90120177.2

[51] Int. Cl.$^5$ .................................... G01B 11/02
[52] U.S. Cl. ................................... 356/356; 356/358; 356/305; 356/399; 356/401
[58] Field of Search ............... 356/356, 358, 354, 355, 356/305, 399, 401

[56] References Cited

U.S. PATENT DOCUMENTS

| | | | |
|---|---|---|---|
| 3,648,055 | 3/1972 | DeLang | 250/231 R |
| 4,176,276 | 11/1979 | Kaul et al. | 250/237 |
| 4,576,850 | 3/1986 | Martens | 428/156 |
| 4,636,076 | 1/1987 | Pettigrew | 356/356 |
| 4,776,701 | 10/1988 | Pettigrew | 356/356 |

FOREIGN PATENT DOCUMENTS 2316248 10/1974 Fed. Rep. of Germany .
1474049 5/1977 United Kingdom .

OTHER PUBLICATIONS

V. Sieber, "Photoelektrischer x-y-Längenschrittgeber," Band 75, Heft 12, Feinwerktechnik, 490-93, Dec. 1971.
Dissertation, Hock, "Photoelektrische Messung Der Änderung Von Längen Oder Winkelpositionen Mit Hilfe von Beugungsgittern," 1975.
Rassudova and Gerasimov, "The Use of Reflection Diffraction Gratings in Interference Systems for Measuring Linear Shifts," Optical Spectroscopy 14, 215 (1963).

*Primary Examiner*—Samuel A. Turner
*Assistant Examiner*—LaCharles P. Keesee
*Attorney, Agent, or Firm*—Willian Brinks Olds Hofer Gilson & Lione

[57] ABSTRACT

In an interferential measurement device for at least one direction of measurement for measuring the relative position of objects, the collimated light beam bundle emanating from a light source is split into three diffraction beams in the at least one direction of measurement at a scanning grid. These three diffraction beams are divided into eight diffraction beams at a cross grid of a material measure and in turn come to interference at a scanning grid under renewed diffraction. The resultant diffraction beams fall on detectors for the generation of measured positional values for the at least one direction of measurement. The cross grid of the scale extends diagonally to the at least one direction of measurement and has an effective grid constant de in the direction of measurement, which agrees with the grid constant d of the scanning grid. The detectors are disposed in such a way that only diffraction beams are detected, which were deflected by the cross grid in the X direction of measurement and in the Y direction extending vertically thereto.

24 Claims, 5 Drawing Sheets

INTERFERENTIAL MEASUREMENT DEVICE FOR AT LEAST ONE DIRECTION OF MEASUREMENT

BACKGROUND OF THE INVENTION

1. Field of the Invention

The present invention relates to an interferential measurement device for measuring the relative position of objects in at least one direction of measurement, and more particularly, to a measurement device where by means of light beam diffraction a material measure is scanned by a scanning unit having at least one light source.

2. Description of the Prior Art

Interferential measurement devices are used particularly in a processing tool for measuring the relative position of a tool with respect to a workpiece to be processed.

For example, the dissertation of Fromund Hock, Stuttgart, 1978, entitled "Photoelektrische Messung der Änderung von Längen und Winkelpositionen mit Hilfe von Beugungsgittern," [Photoelectric Measurement of the Change of Lengths and Angular Positions with the Aid of Diffraction Grids], Section 11.6, describes an interferential measurement device for two directions of measurement. A collimated light beam bundle emanating from a light source passes through a cross grid of a scale whereupon the beam bundle is diffracted into diffraction beams deflected into the first and second directions of measurement. The cross grid of the scale extends diagonally to the two directions of measurement. The beam bundle then passes through four spatial frequency filter screens and is displayed by means of two lenses on a first linear grid. The first linear grid is oriented in the first direction of measurement and unites the diffraction beams which have been deflected at the scale into this first direction of measurement. The combined diffraction beams of the first direction of measurement are guided by means of a third lens to first detectors, which provide scanning signals for the generation of measured values for the first direction of measurement. The diffraction beams which have been deflected at the scale into the second direction of measurement are displayed with the aid of a fourth lens on a second linear grid which is oriented in the second direction of measurement. The second linear grid unites the diffraction beams which have been deflected at the scale into this second direction of measurement. The combined diffraction beams of the second direction of measurement are guided to second detectors which provide scanning signals for the generation of measured values for the second direction of measurement. This measurement device has the disadvantage of having a costly construction due to the many pieces of hardware required.

An interferential measurement device for one direction of measurement is known from European Patent Application 0 163 362 B1. A light beam bundle emanating from a light source and collimated by means of a collimator lens is split into a plurality of diffraction beams in the course of a first passage through a scanning grid and is again diffracted under reflection at a scale grid. The reflected diffraction beams once again pass through the scanning grid where they are yet again diffracted and brought into interference. The interfering diffraction beams in the direction of resultant 0th, +1st and −1st ordered beams are separated by a collimator lens and directed to three detectors for the generation of electrical scanning signals to obtain measured values.

In this measurement device the scale grid must be embodied in such a way that the diffraction beam of the 0th order is suppressed at the scale grid. This results in the disadvantage that diffraction beams of the 3rd order appear at the scale grid so that the scanning signals obtained by means of the detectors have a high harmonic wave component which does not permit a high interpolation of the scanning signals. Since in practice the suppression of the diffraction beam of the 0th order at the scale grid is only possible within certain tolerances, with a short distance between the scanning grid and the scale grid, an interfering sub-harmonic appears in the scanning signals which also does not permit high interpolation of the scanning signals. The direct reflections of the scanning grid which strike the detectors by lowering the modulation degree have shown to be a further disadvantage.

It is an object of the present invention to provide an interferential measurement device for at least one direction of measurement of considerably higher measurement accuracy and simpler structure.

The advantages obtained by means of the invention consist in particular in that by the use of a cross grid only, diffraction beams are detected which are deflected at the cross grid in the direction of measurement as well as vertically to the direction of measurement. Thus the diffraction beam of the 0th order of the cross grid as well as the beams directly reflected by the scanning grid do not reach the detectors. Therefore the cross grid can be embodied in such a way that diffraction beams of the 3rd order are suppressed at the cross grid thereby obtaining scanning signals having a higher degree of modulation and an extremely small harmonic wave component. Moreover, diffraction beams of even order of the scale, such as appear in the measurement device of European Patent Application 0 163 362 B1 in case of incomplete formation of the scale grid, do not fall on the detectors. The signal shape improved by this permits high interpolation of the scanning signals. Furthermore, with a short distance between the scanning grid and the cross grid no interfering sub-harmonics are created in the scanning signals.

SUMMARY OF THE INVENTION

An interferential measurement device and method for measuring the relative position of objects in at least a first direction of measurement having at least one light source emitting a light beam having frequency components unable to interfere with one another. A first scanning grid having grid lines vertically spaced in the first direction for diffracting the light beam emitted from the light source into a first set of diffraction beams. The first set of diffraction beams are diffracted into a second set of diffraction beams by a material to be measured having a diffraction structure. The second set of diffraction beams are deflected in the first direction of measurement and a second direction of measurement perpendicular to the first direction. The second set of diffraction beams are again diffracted to create resultant diffraction beams by the first scanning grid. At least one group of detectors receives the resultant diffraction beams and generates scanning signals which are 120° out of phase with respect to each other.

DETAILED DESCRIPTION OF THE PREFERRED EMBODIMENTS

Figure 1:
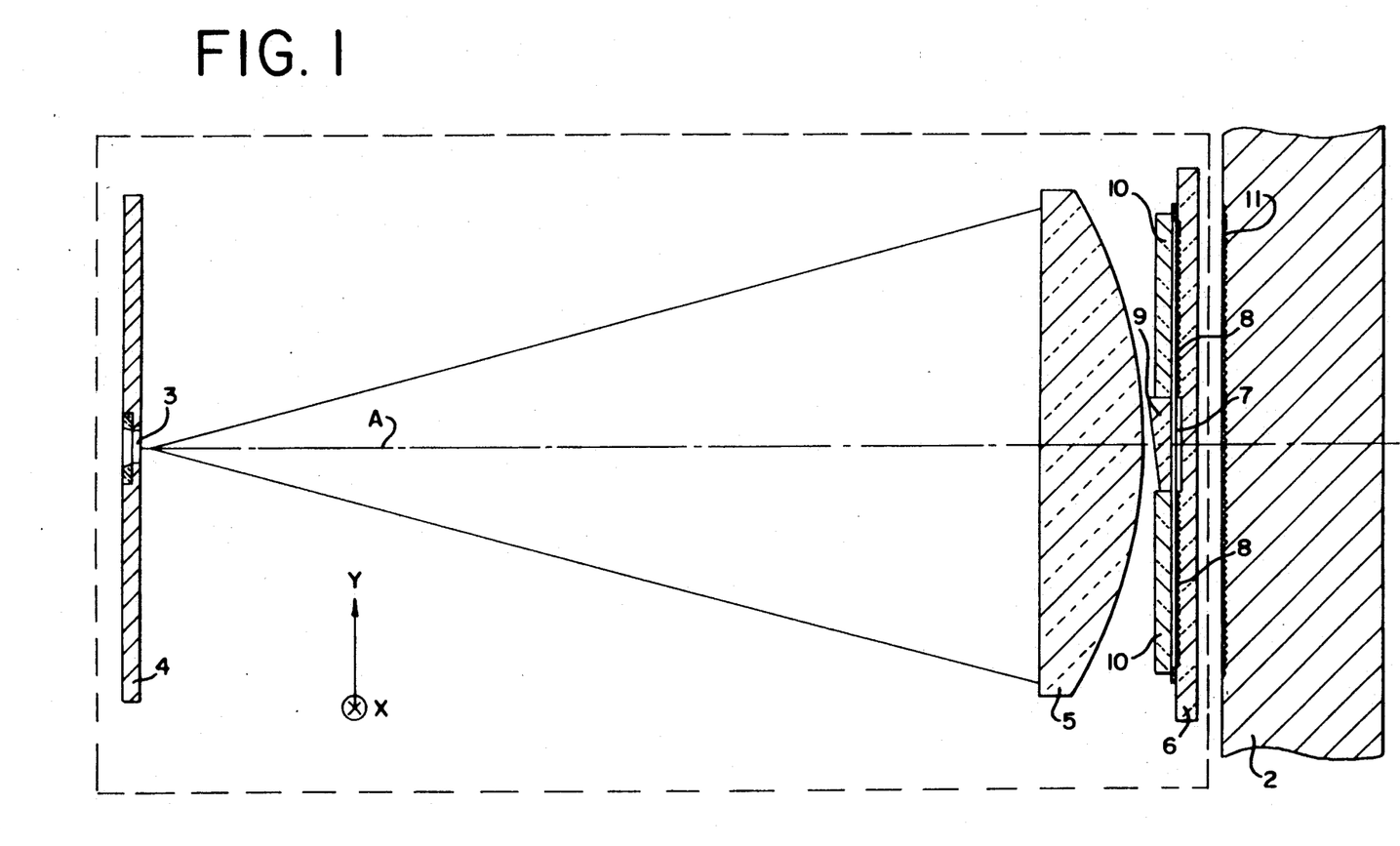
FIG. 1 is a schematic view of a preferred embodiment of an interferential measurement device according to a first embodiment of the present invention.

In FIG. 1 an interferential measurement device for two directions of measurement, X and Y, is shown in accordance with a first embodiment of the present invention. The scanning unit 1 includes a board 4, a collimator 5 and a scanning plate 6. The scanning unit 1 scans a material to be measured in the form of a reflection scale 2. This measurement device is used for measuring the relative position of objects by mounting the scanning unit 1 on one object and the reflection scale 2 on another object.

Figure 2:
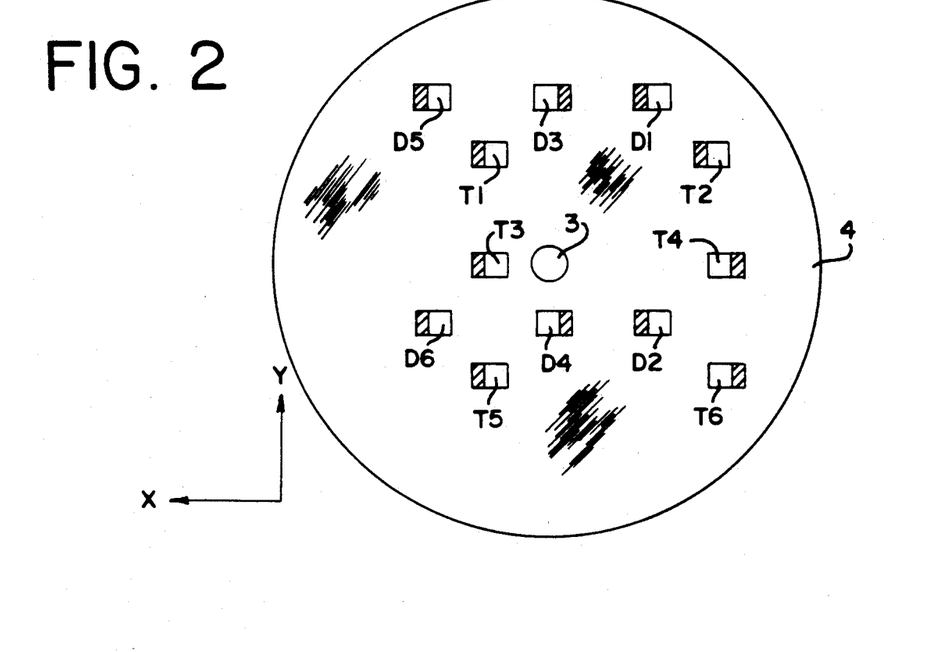
FIG. 2 is a top view of a board with a light source and two groups of detectors.

FIG. 2 illustrates a top view of the board 4 on which resides a light source 3 such as a laser, a first group of detectors D1-D6 for the X direction of measurement and a second group of detectors T1-T6 for the Y direction of measurement.

Figure 3:
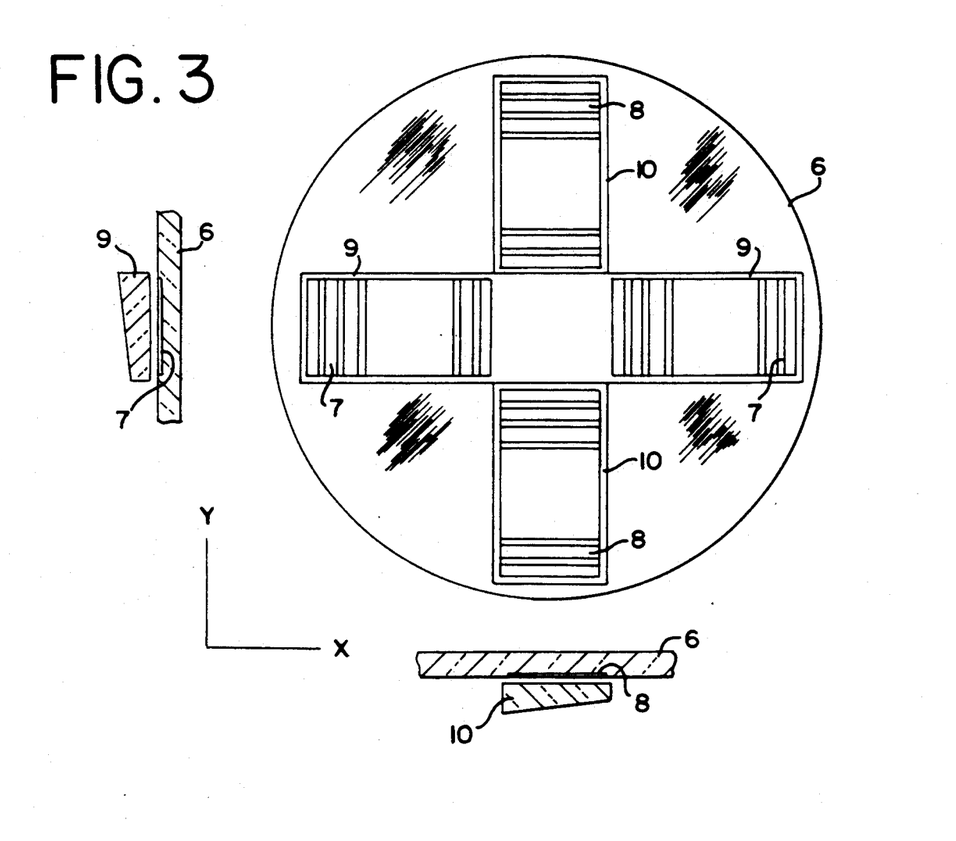
FIG. 3 is a top view of a scanning plate with two crossed scanning grids.

In FIG. 3 the scanning plate 6 is shown in a top view. The scanning plate 6 has a first scanning grid 7 for the X direction of measurement and a second scanning grid 8 for the Y direction of measurement. The first and second scanning grids 7 and 8 may, for example, be in the form of phase grids. A first deflection prism 9 is disposed atop the first scanning grid 7 and a second deflection prism 10 is disposed atop the second scanning grid 8. The orientation and inclination of the deflection prisms with respect to the scanning grids can be seen in FIG. 3.

Figure 4:
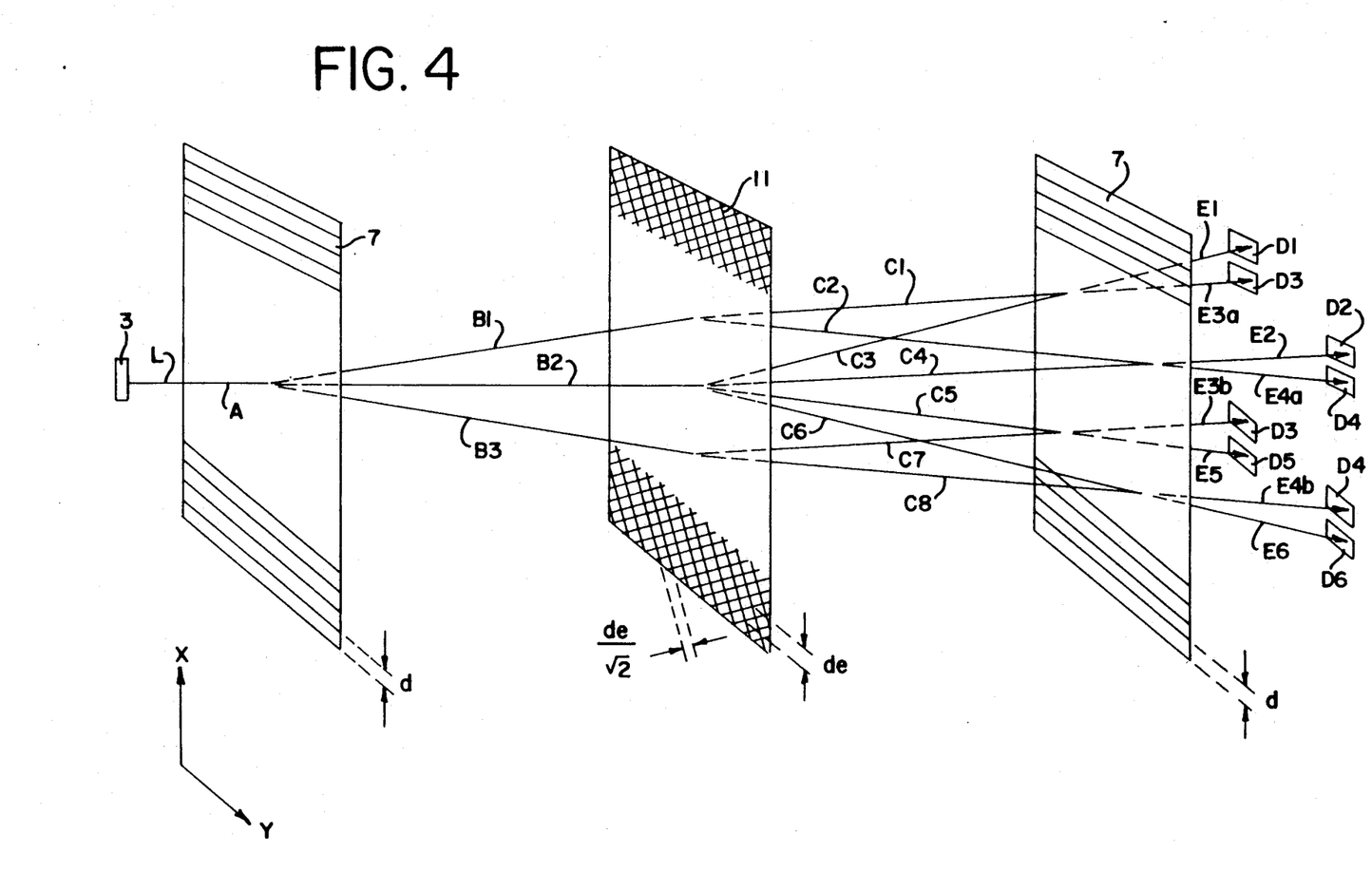
FIG. 4 illustrates a developed beam course for the measurement device of FIG. 1 in one direction of measurement.

FIG. 4 shows a developed beam course for the interferential measurement device of FIG. 1. For the sake of clarity only one direction of measurement, the X direction, is illustrated. In addition, to simplify matters, only certain diffraction beams have been drawn. A light beam bundle L emitted by the light source 3 and collimated by the collimator 5 is divided into a plurality of diffraction beams when passing through the scanning grid 7. The scanning grid 7 has a grid constant d and its grid lines are spaced vertically in the X direction of measurement. Scanning grid 7 diffracts the beam bundle L into various ordered beams of diffraction of these a +1st order diffraction beam B1; a 0th order diffraction beam B2; and a −1st order diffraction beam B3.

These diffraction beams B1-B3 then pass through a diffraction structure in the form of a cross grid 11 located on the scale 2. The grid lines of cross grid 11 extend diagonally to both the X and Y directions of measurement. The diagonal spacing of the grid lines results in a grid constant of $d_e/\sqrt{2}$. In the X direction of measurement the effective grid constant is $d_e$, which is equal to the grid constant d of the scanning grid 7. A cross grid is defined as a structure which diffracts light beams essentially in two orthogonal directions. The cross grid 11 may consist, for example, of a periodic arrangement orthogonal in two directions on a single structure. These two directions are referred to as grid lines of the cross grid. In such a case it is always possible to specify a smallest single structure from which the cross grid can be generated by periodical continuous combination in two orthogonal directions. The cross grid 11 splits each diffraction beam B1-B3 into two diffraction beams of the +1st order and two diffraction beams of the X −1st order. These diffraction beams are deflected by the diagonal disposition of the cross grid 11 in the X direction of measurement as well as in the Y direction of measurement.

Thus, the diffraction beam B1 is split into two −1st order diffraction beams C1 and C2 and two +1st order diffraction beams (not shown). The diffraction beam B2 is split into two +1st order diffraction beams C3 and C4 and two −1st order diffraction beams C5 and C6. The diffraction beam B3 is split into two +1st order diffraction beams C7 and C8 and two −1st order diffraction beams (not shown).

Afterwards the diffraction beams C1-C8 again pass through the scanning grid 7 where they are brought into interference under renewed diffraction. The interfering diffraction beams C1 and C3 create a resultant +1st order diffraction beam E1 in the X direction of measurement and a resultant 0th order diffraction beam E3a in the X direction of measurement. The interfering diffraction beams C2 and C4 create a resultant +1st order diffraction beam E2 in the X direction of measurement and a resultant 0th order diffraction beam E4a in the X direction of measurement. The interfering diffraction beams C5 and C7 create a resultant 0th order diffraction beam E3b in the X direction of measurement and a resultant −1st order diffraction beam E5 in the X direction of measurement. The interfering diffraction beams C6 and C8 create a resultant 0th order diffraction beam E4b in the X direction of measurement and a resultant −1st order diffraction beam E6 in the X direction of measurement.

These resultant diffraction beams E1-E6 pass through the deflection prism 9 and the condenser 5 and fall on the first group of detectors D1-D6 on board 4. As discussed above, detectors D1-D6 are used for the X direction of measurement. The resultant diffraction beams E3a and E3b both fall on detector D3 and the resultant diffraction beams E4a and E4b both fall on detector D4. The detectors D1-D6 generate electrical scanning signals which are supplied to a homodyne-operating evaluation unit AE (shown in FIG. 5) for obtaining measured positional values W for the X direction of measurement.

A beam course of the same kind, not shown, also exists for the Y direction of measurement. The second group of detectors T1-T6 also generates electrical scanning signals from which measured positional values for the Y direction of measurement are obtained by means of the homodyne-operating evaluation unit AE.

The two separating elements in the form of the deflection prisms 9 and 10 are used for separating the diffraction beams E1–E6 for the X and Y directions of measurement if only one light source 3 is provided. In a manner not shown, it is also possible to use grids or polarizing optical elements as separating elements. In addition, it is also possible to provide a plurality of light sources, in which case it might be possible to do without the separating elements. It is also possible to detect, for example displaced in time, with only one detector group the diffraction beam groups which are part of the X and Y directions of measurement with the use of a plurality of light sources.

The harmonic wave component and thus the quality of the scanning signal depends on at least one light source 3 being used. If, for example, the light source 3 emits light the frequency components of which are capable of interfering, signal components appear in the scanning signals which oscillate with the difference frequency of the frequency components. Such beat frequencies are known from the heterodyne interferometer technology.

However, with the measurement device in accordance with the present invention which can be designated as a homodyne-operating measurement device, in contrast to heterodyne interferometers, these beat signals cause interference. For this reason the light source 3 must emit light, the frequency components of which cannot interfere with each other. For example, one or a plurality of lasers can be used as a light source, each one of which emits light with only one frequency component. It is also possible to provide one or a plurality of lasers emitting light of several different frequency components if the distances between the frequencies of the individual frequency components are great enough so that the detectors D1–D6 and T1–T6 can no longer detect the signal components which oscillate at the beat frequencies. This means that the several frequency components are not able to interfere with each other.

Furthermore, it is also possible to provide at least one light source 3 with a broad-band emission spectrum, such as a light-emitting diode. Light sources with spectrally broad-band emission spectra are preferably used because in this case the harmonic wave component of the scanning signals is small. Also, a spatial extension of the at least one light source 3 reduces the harmonic wave component of the scanning signals. For this reason it is particularly advantageous to use at least one spectrally broad-band and spatially extended light source 3, for example a light-emitting diode.

Figure 5:
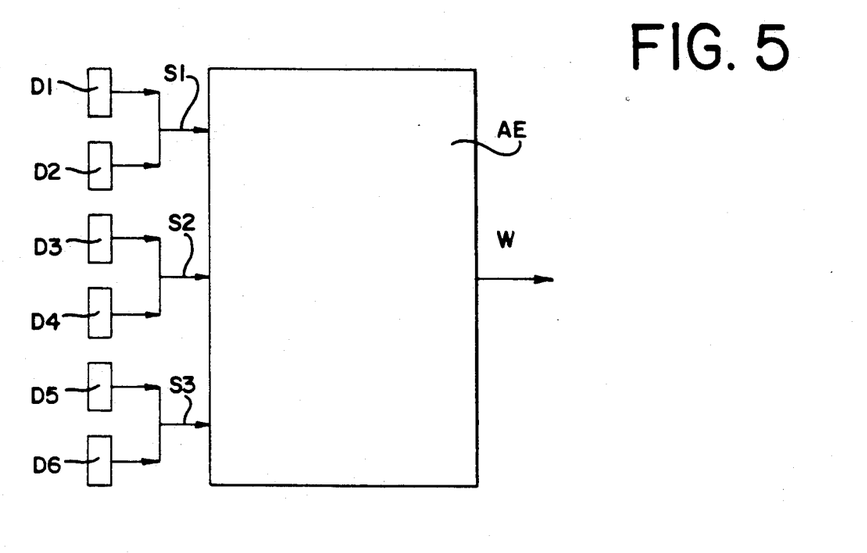
FIG. 5 illustrates a group of detectors with an evaluation unit.

FIG. 5 illustrates a group of detectors D1–D6 with a homodyne-operation evaluation unit AE switched in downstream. The detectors D1, D2; D3, D4; and D5, D6 are switched together in pairs and supply the combined sinusoidal scanning signals S1, S2 and S3 with a reciprocal phase shift which depends on the design of the scanning grid 7. Preferably a phase shift of 120° is achieved.

Figure 6:
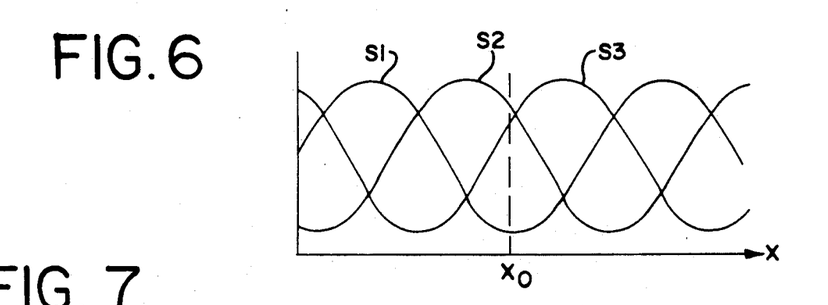
FIG. 6 illustrates a signal diagram with scanning signals.

FIG. 6 illustrates a signal diagram with three combined scanning signals S1, S2 and S3 with a reciprocal phase shift of 120° for the X direction of measurement as a function of the X measured path. These three combined scanning signals S1, S2 and S3 are supplied to the evaluation unit AE in accordance with FIG. 5, which derives the measured positional value W for an arbitrary relative position $x_o$ of the two objects from the instantaneous values, amplitude values or signal level, of the scanning signals S1, S2 and S3.

Because this evaluation unit AE does not us the phase position of a beat signal oscillating in time for the determination of this relative position $x_o$, as is known from the heterodyne interferometer technology, but instead utilizes the instantaneous values of the three scanning signals S1, S2 and S3, it is designated as a homodyne-operating evaluation unit AE. The evaluation unit AE may contain counters for counting the individual signal periods of the scanning signals S1, S2, and S3, and its may contain at least one interpolation unit for increasing the accuracy of the measured positional values W as is known by those skilled in the art. In the simplest case the homodyne-operating evaluation unit AE may also output, within a limited range of the relative position of the two objects, the instantaneous value of a scanning signal as a direct measurement of the relative position.

The above steps are also true for the second group of detectors assigned to the Y direction of measurement. In a manner not shown it is also possible to employ a different number of detectors, for example three detectors, for each group.

Figure 7:
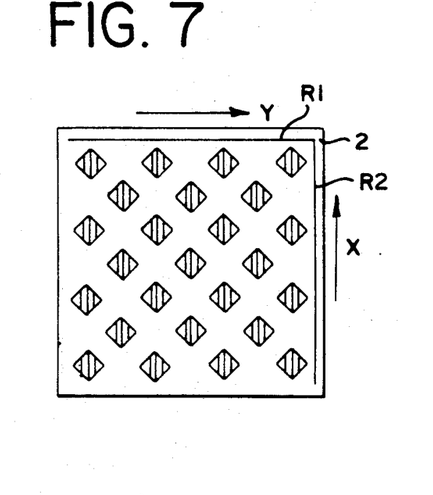
FIG. 7 illustrates a material measure with reference marks.

The diffraction structure of the cross grid 11 of the material measure 2 is embodied in a particularly advantageous manner as a phase grid in accordance with FIG. 7 and consists of a periodic arrangement of squares, the edges of each of which lie parallel to the grid lines of the cross grid and the distance of which is equal to the length of their edges. This creates the advantage of a particularly small harmonic wave component of the scanning signals S1, S2, and S3.

In accordance with FIG. 7, at least one reference mark R1 and R2 for obtaining at least one reference signal is assigned to the reflection scale 2. In FIG. 7, the direction of measurement X is assigned a first reference mark R1 and the direction of measurement Y is assigned a second reference mark R2. These reference marks R1 and R2 extend longitudinally over the entire measuring distance of the Y direction of measurement and X direction of measurement respectively. The reference marks R1 and R2 lie vertical to their direction of measurement so that in any arbitrary position of the scanning unit 1 in relation to the material to be measured 2 they can only be scanned by displacement of the scanning unit 1 in the associated direction of measurement X and Y, when needed.

Figure 8:
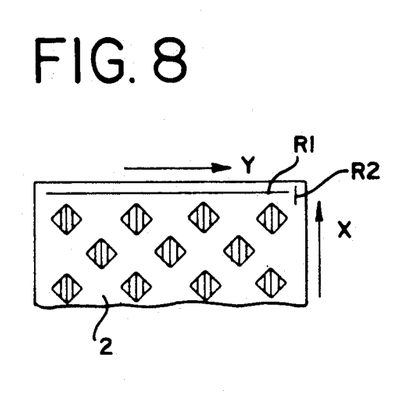
FIG. 8 illustrates a material measure with reference marks alternate to those shown in FIG. 7.

In accordance with FIG. 8, it is also possible that only the one reference mark R1 for the direction of measurement X extends longitudinally, while the other reference mark R2 does not.

In accordance with FIG. 4 the measurement device has an optical axis A which is given by the direction of the vertical line of the scanning grid 7 and of the cross grid 11 arranged parallel thereto. Because the light source 3 is disposed on the optical axis A and the light beam bundle L emanating from the light source 3 and collimated by means of the collimator 5 strikes the scanning grid 7 on the optical axis A, there is a small difference in the length of the optical paths between the individual interfering diffraction beams of each pair C1, C3; C2, C4; C5, C7 and C6, C8 from which each of the resultant diffraction beams E1–E6 are formed, which is the result of the transverse deflection caused by the cross grid 11 of the diffraction beams C1–C8.

For example, the sum of the optical path lengths of the diffraction beams B1 and C2 is not identical with the sum of the optical path lengths of the diffraction beams B2 and C4. These differences in optical path lengths lead to phase shifts in the periodic scanning signals of the assigned detectors D1–D6 which may lead to measuring inaccuracies. The differences in optical path lengths are a function of the distance between the scanning grid 7 and the cross grid 11 as well as the inverse fourth power of the grid constant d and de of the scanning grid 7 and the cross grid 11, respectively.

Figure 9:
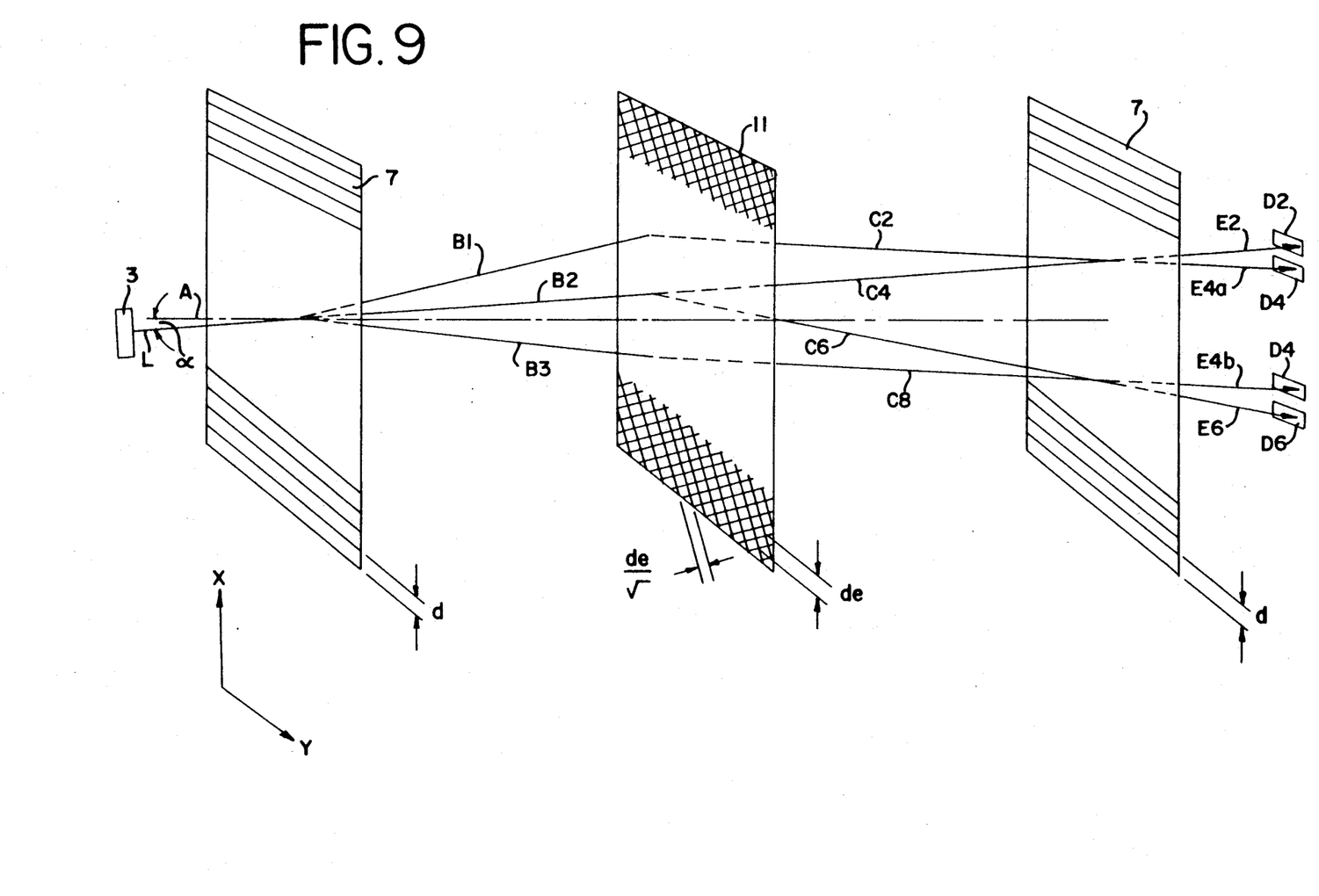
FIG. 9 illustrates a beam course for a measurement device in one direction of measurement in accordance with a second embodiment of the present invention.

FIG. 9 illustrates a beam course for a measurement device in one direction of measurement in accordance with a second embodiment of the present invention. The measurement device of FIG. 9 avoids the measuring inaccuracies because of phase shifts of the periodic scanning signals discussed above.

In accordance with the present invention, the light source 3 emits light collimated by means of the collimator 5, which is inclined at a set angle $\alpha$ with respect to the optical axis A vertically to the Y direction of measurement. A light beam bundle L emanating from this light source 3 and collimated by means of the collimator 5 passes through the scanning grid 7 at this angle $\alpha$ and is divided into a plurality of diffraction beams of which a +1st order diffraction beam B1, a 0th order diffraction beam B2, and a −1st order diffraction beam B3 are shown.

These diffraction beams B1-B3 pass through the cross grid 11 of the reflection scale 2. The cross grid 11 splits each diffraction beam B1-B3 into two diffraction beams of the +1st order and two diffraction beams of the −1st order which are deflected by the diagonal arrangement of the cross grid 11 in the X direction of measurement as well as in the Y direction of measurement.

Thus the diffraction beam B1 is split into a −1st order diffraction beam C2; the diffraction beam B2 is split into a +1st order diffraction beam C4, and a −1st order diffraction beam C6; and the diffraction beam B3 is split into a +1st order diffraction beam C8. The remaining diffraction beams, which are not required, have not been shown for reasons of clarity.

Subsequently, the diffraction beams C2, C4, C6 and C8 again pass through the scanning grid 7 and come to interference under renewed diffraction. From the interfering diffraction beams C2 and C4 the resultant +1st order diffraction beam E2, in the X direction of measurement and the resultant 0th order diffraction beam E4a, in the X direction of measurement are created. From the interfering diffraction beams C6 and C8 the resultant 0th order diffraction beam E4b, in the X direction of measurement and the resultant −1st order diffraction beam E6 in the X direction of measurement are created.

These resultant diffraction beams E2, E4a, E4b and E6 pass through the collimator 5 and fall upon a group of three detectors D2, D4 and D6 for the X direction of measurement. The resultant diffraction beams E4a and E4b both fall on the detector D4. The three detectors D2, D4 and D6 generate periodic scanning signals with a reciprocal phase shift of 120° from which the measured positional values for the X direction of measurement are obtained in a known manner.

If the light source 3 emits light collimated by means of the collimator 5 at an optimal angle $\alpha = \arcsin(\lambda/2d)$ where $\lambda$ = wavelength of the light beam bundle L, vertically inclined to the direction of measurement with respect to the optical axis A (direction Y), no difference in the optical path length between the individual interfering diffraction beams of each pair C2, C4 and C6, C8 occurs. This means that the sum of the optical path lengths of the two diffraction beams B1 and C2 equals the sum of the optical lengths of the two diffraction beams B2 and C4. In the same way, the sum of the optical path lengths of the two diffraction beams B2 and C6 is equal to the sum of the optical path lengths of the two diffraction beams B3 and C8. Thus, even with the small grid constants d and de of the scanning grid 7 and the cross grid 11 respectively, no distance-dependent phase shifts occur in the periodic scanning signals which can lead to measuring inaccuracies.

The measurement device can be embodied in accordance with the principles of incident light measuring as well as with the principles of transmitted light measuring. In addition, it is also possible to provide a plurality of light sources instead of one light source. With a measurement device in accordance with the principle of incident light measuring, the resultant diffraction beam E4a and E4b would fall back into the light source 3 at the optimal illumination angle $\alpha = \arcsin(\lambda/2d)$. For this reason the angle $\alpha$ must deviate a little from the ideal angle $\alpha = \arcsin(\lambda/2d)$ so that a separation between the collimated light beam bundle L and the resultant diffraction beams E4a and E4b is assured.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. An interferential measurement device for measuring the relative position of objects in at least a first direction of measurement comprising:
    at least one light source, said light source emitting a light beam having frequency components unable to interfere with one another;
    a first scanning grid having grid lines vertically extending to said first direction, said first scanning grid diffracting said light beam emitted by said light source into a first set of diffraction beams;
    a material to be measured, said material to be measured having a diffraction structure for receiving said first set of diffraction beams from said grid and generating a second set of diffraction beams in both said first direction of measurement and in a second direction of measurement, said second direction of measurement being perpendicular to said first direction of measurement;
    said second set of diffraction beams directed to impinge upon said first scanning grid to generate a resultant set of diffraction beams; and
    at least one group of detectors for generating scanning signals, said group of detectors arranged to detect beams deflected at said diffraction structure of said material measure in said first and second direction.

2. A measurement device according to claim 1 wherein said scanning signals generated by said group of detectors are supplied to a homodyne-operating evaluation unit for the formation of measured positional values.

3. A measurement device according to claim 1 wherein said diffraction structure of said material measure comprises a cross grid having grid lines extending diagonally to said first direction of measurement.

4. A measurement device according to claim 1 wherein said scanning grid has a grid constant d equal to the effective grid constant de of said diffraction structure of said material measure in said first direction of measurement.

5. A measurement device according to claim 1 further comprising a second scanning grid having grid lines vertically extending to said second direction so that grid lines of said second scanning grid is perpendicular to grid lines of said first scanning grid.

6. A measurement device according to claim 1 wherein said material measure consists of a periodic arrangement of squares having edges extending parallel to the direction of grid lines forming said diffraction structure and each square spaced from one another by a length equal to the length of a square edge.

7. A measurement device according to claim 1 wherein said group of detectors is able to discriminate two orthogonal directions of measurement.

8. A measurement device according to claim 1 wherein said group of detector comprises two separate groups of detectors able to discriminate two orthogonal directions of measurement.

9. A measurement device according to claim 1 further comprising separating elements provided to separating said resultant set of diffraction beams.

10. A measurement device according to claim 9 wherein said separating elements comprise one of a deflection prism, a diffraction grid and a polarizing optical element.

11. A measurement device according to claim 1 wherein said group of detectors comprises three detectors for generating scanning signals for said first direction of measurement.

12. A measurement device according to claim 1 wherein said group of detectors comprises six detectors for the generation of scanning signals for said first direction of measurement, said six detectors switched together in pairs of two to detect said resultant diffraction beams having the same inclination in said first direction of measurement.

13. A measurement device according to claim 1 wherein said scanning grid defines a reciprocal phase position of said scanning signals.

14. A measurement device according to claim 1 wherein only those resultant diffraction beams are detected, which are deflected in the respective direction of measurement into the +1st, 0th and −1st orders, and that said scanning signals supplied by said group of detectors have a reciprocal phase position of preferably 120° because of defined characteristics of said scanning grid.

15. A measurement device according to claim 2 wherein said homodyne-operating evaluation unit includes at least one interpolating unit.

16. A measurement device for measuring the relative position of objects in at least two directions of measurement, where a material measurement is scanned by a scanning unit, comprising:
   at least one reference mark for obtaining at least one reference signal assigned to the material measurement; and
   at least one reference mark extending longitudinally in the direction of measurement which lies vertically to the direction of measurement assigned to it.

17. A measurement device according to claim 16 wherein said reference mark extends longitudinally across the entire measuring length of the measurement direction which lies vertically to the direction of measurement assigned to it.

18. A measurement device according to claim 1 wherein said light source emits spectrally broad-band light.

19. A measurement device according to claim 1 wherein said light source is spatially extended.

20. A measurement device according to claim 1 wherein said light beam bundle emanating from said light source and collimated by means of a collimator forms an angle $\alpha$ relation to an optical axis.

21. A measurement device according to claim 20 wherein said angle $\alpha$ is equal to or approximately equal to the ideal value arcsin $(a/2d)$ where $a$ = wavelength of said light source 3.

22. A measurement device according to claim 1 wherein said light source consists of a light-emitting diode.

23. A measurement device according to claim 6 wherein said material measure comprises a phase grid.

24. A method for measuring the relative position of an object in at least a first direction of measurement using an interferential measuring device comprising the steps of:
   emitting a light beam having frequency components unable to interfere with one another;
   diffracting said light beam emitted by said light source into a first set of diffraction beams;
   receiving said first set of diffraction beams and generating a second set of diffraction beams in both said first direction of measurement and a second direction of measurement, said second direction of measurement being perpendicular to said first direction of measurement;
   receiving said second set of diffraction beams and generating a resultant set of diffraction beams; and
   generating scanning signals by using detectors, said detectors arranged in such a way that only those diffraction beams which ar deflected in said first and said second direction of measurement are detected.

* * * * *

UNITED STATES PATENT AND TRADEMARK OFFICE
CERTIFICATE OF CORRECTION

PATENT NO. : 5,264,915
DATED : November 23, 1993
INVENTOR(S) : WALTER HUBER et al.

It is certified that error appears in the above-indentified patent and that said Letters Patent is hereby corrected as shown below:

Column 1, line 11, please delete "where by" and substitute therefor --whereby--.

Column 1, line 12, after "diffraction" insert --of--.

Column 5, line 67, delete "us" and substitute --use--.

Column 6, line 7, delete "its" and substitute --it--.

Column 6, line 21, delete "measure 2" and substitute --to be measured--.

Column 6, line 40, please delete "2".

Column 9, line 1, delete "measure" and substitute --to be measured--.

Column 8, lines 63-64, delete "measure" and substitute --to be measured--.

Column 8, line 55, delete "measure" and substitute --to be measured--.

UNITED STATES PATENT AND TRADEMARK OFFICE
CERTIFICATE OF CORRECTION

PATENT NO. : 5,264,915
DATED : November 23, 1993
INVENTOR(S) : WALTER HUBER et al.

It is certified that error appears in the above-identified patent and that said Letters Patent is hereby corrected as shown below:

Column 9, line 18, delete "detector" and substitute --detectors--.

Column 8, line 22, delete "separating" and substitute --separate--.

Column 10, line 51, delete "ar" and substitute --are--.

Signed and Sealed this

Fifteenth Day of November, 1994

Attest:

BRUCE LEHMAN

*Attesting Officer*          *Commissioner of Patents and Trademarks*